US006329580B1

(12) United States Patent
DeVivo

(10) Patent No.: US 6,329,580 B1
(45) **Date of Patent: *Dec. 11, 2001**

(54) TWO-TIERED MUSIC BOX WITH REVOLVING FIGURINES

(75) Inventor: Douglas E. DeVivo, Taipei (TW)

(73) Assignee: Mercuries Asia Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/456,891

(22) Filed: Dec. 7, 1999

Related U.S. Application Data

(63) Continuation of application No. 08/904,849, filed on Aug. 1, 1997, which is a continuation-in-part of application No. 08/802,823, filed on Feb. 19, 1997, now Pat. No. 5,705,759, which is a continuation-in-part of application No. 08/376,036, filed on Jan. 20, 1995, now abandoned.

(51) Int. Cl.$^7$ .................................................... G01F 1/06

(52) U.S. Cl. ........................... 84/95.1; 84/95.2; 84/94.1; 84/94.2

(58) Field of Search .................................... 84/94.1, 94.2, 84/95.1, 95.2; 446/268, 269; 40/409, 411

(56) References Cited

U.S. PATENT DOCUMENTS

| | | | |
|---|---|---|---|
| D. 24,965 | 12/1895 | Ehrlich | D17/24 |
| D. 286,796 | 11/1986 | Simmons | D21/405 |
| 1,348,386 * | 8/1920 | Wronowski | 446/265 |
| 3,349,661 | 10/1967 | Searle | 84/94.2 |
| 3,594,934 | 7/1971 | Burnbaum | 40/430 |
| 4,196,899 | 4/1980 | Patterson | 472/137 |
| 4,203,241 | 5/1980 | Wallace | 40/406 |
| 4,344,243 | 8/1982 | Reszka | 40/407 |
| 4,458,573 | 7/1984 | Isaka | 84/95.1 |
| 4,490,931 | 1/1985 | Fleemin | 40/406 |
| 4,521,982 | 6/1985 | Altuchow | 40/407 |
| 4,573,939 | 3/1986 | Hoshino | 446/298 |
| 4,618,330 | 10/1986 | Abe | 446/236 |
| 4,641,445 | 2/1987 | Rossi | 40/410 |
| 4,771,902 | 9/1988 | Teng | 215/376 |
| 4,817,311 | 4/1989 | Ong S. T. | 40/410 |
| 4,852,283 | 8/1989 | Teng | 40/426 |
| 4,858,079 | 8/1989 | Ohashi | 362/35 |
| 4,961,276 | 10/1990 | Lin | 40/410 |
| 4,983,890 | 1/1991 | Satoh et al. | 318/3 |
| 5,070,633 | 12/1991 | Liu | 40/411 |
| 5,088,218 | 2/1992 | Liu | 40/411 |
| 5,090,144 | 2/1992 | Teng | 40/410 |
| 5,110,636 | 5/1992 | Hou | 428/11 |
| 5,131,795 | 7/1992 | Liu | 40/410 |
| 5,134,795 | 8/1992 | Wang | 40/411 |

(List continued on next page.)

FOREIGN PATENT DOCUMENTS

| | | |
|---|---|---|
| 562834 | 5/1958 | (BE) . |
| 604908 | 5/1960 | (IT) . |

OTHER PUBLICATIONS

The San Francisco Music Box Company Catalog Nov. 2, 1991 pp. 32 and 34.

Collector' Information Bureau's Collectibles Market Guide & Price Index 1994 p. 16.

*Primary Examiner*—Shih-Yung Hsieh
(74) *Attorney, Agent, or Firm*—Luce, Forward, Hamilton & Scripps, LLP

(57) ABSTRACT

A decorative display device comprising figurines arranged in tiered first and second scenes, one scene being placed above the other. Each of the upper and lower tier scenes is coupled to a wind-up drive and music box mechanism and when rotated appears to be in synchronization with the music. The rotatable and music synchronized scenes are more noticeable and aesthetically pleasing and, thus, provide a more interesting display. The upper and lower tier scenes may rotate simultaneously, at different speeds (but in the same direction), in opposite directions, in opposite directions at different speeds, or one scene may rotate while the other scene remains stationary.

7 Claims, 6 Drawing Sheets

U.S. PATENT DOCUMENTS

| | | | |
|---|---|---|---|
| 5,179,796 | 1/1993 | Gephart, Jr. | 40/473 |
| 5,189,821 | 3/1993 | Lee | 40/406 |
| 5,221,225 | 6/1993 | Newbolt et al. | 446/297 |
| 5,226,845 | 7/1993 | Wu | 446/265 |
| 5,286,535 | 2/1994 | Hou | 428/11 |
| 5,313,727 | 5/1994 | Murray, Jr. | 40/410 |
| 5,338,583 | 8/1994 | Hou | 428/7 |
| 5,396,723 | 3/1995 | Liu | 40/410 |
| 5,416,995 | 5/1995 | Teng | 40/419 |
| 5,442,869 | 8/1995 | McDarren et al. | 40/406 |
| 5,456,031 | 10/1995 | Hou | 40/410 |
| 5,458,012 | 10/1995 | Liu | 74/52 |
| 5,483,763 | 1/1996 | Liu | 40/414 |
| 5,491,916 | 2/1996 | Ingram et al. | 40/410 |
| 5,502,908 | 4/1996 | Powell et al. | 40/410 |
| 5,532,422 | 7/1996 | Chang | 84/95.1 |
| 5,548,912 | 8/1996 | Liu | 40/430 |
| 5,555,656 | 9/1996 | Liu | 40/411 |
| 5,609,341 | 3/1997 | Chuang | 273/448 |
| 5,620,353 | 4/1997 | Lai | 446/136 |
| 5,655,321 | 8/1997 | Chang | 40/409 |
| 5,675,921 | 10/1997 | Lin | 40/409 |

* cited by examiner

TWO-TIERED MUSIC BOX WITH REVOLVING FIGURINES

CROSS REFERENCE TO RELATED PATENT APPLICATIONS

This application is a continuation of prior allowed U.S. patent application Ser. No. 08/904,849, filed Aug. 1, 1997, which is a continuation-in-part of U.S. patent application Ser. No. 08/802,823, filed Feb. 19, 1997, now U.S. Pat. No. 5,705,759, which is a continuation-in-part of U.S. patent application Ser. No. 08/376,036, filed Jan. 20, 1995, now abandoned, each of whose contents are hereby incorporated by reference in their entirety.

FIELD OF THE INVENTION

The present invention relates to devices for displaying ornamental objects and, more particularly, to decorative devices for displaying objects arranged into a plurality of scenes, some of which may be immersed in liquid.

BACKGROUND OF THE INVENTION

Decorative devices for displaying scenes such as contemplated by the present invention, some of which may be immersed in fluid, are well known and are described, for example, in U.S. Pat. No. 4,490,931 (Fleemin), U.S. Pat. No. 5,088,218 (Liu), U.S. Pat. No. 5,110,636 (Hou), U.S. Pat. No. 5,179,796 (Gephart, Jr.), and U.S. Pat. No. 5,286,535 (Hou), all of which are incorporated herein by reference.

The Hou patents disclose a display device having decorative objects that are immersed in a liquid-filled housing that is rotatably mounted on a base and driven by a wind-up music box mechanism. The decorative display device of the Hou patents, while serving its intended purpose, is limited to a single scene. The present invention describes improvements to such a device so that a more noticeable and pleasing display may be made available to enhance the excitement of the aesthetic interest conjured up by such decorative display devices.

OBJECTS OF THE INVENTION

It is, therefore, an object of the present invention to provide decorative display devices having revolving scenes to enhance their aesthetic effect.

It is also an object of the present invention to provide decorative display devices having scenes that are comprised of figurines that are merged together in such a manner so as to enhance the aesthetic effect of the scene.

It is a further object of the present invention to provide decorative display devices having first and second revolving scenes located in a tier arrangement so that both scenes are captured in the field-of-view of an individual so as to enhance both their noticeability and aesthetic effect.

Further still, it is an object of the present invention to provide decorative display devices having counter-revolving scenes so as to further enhance their noticeability.

Yet further, it is another object of the present invention to provide for revolving scenes having complementary and/or contrasting backgrounds so as to not only further enhance their noticeability but to also increase their aesthetic effect.

In addition, it is an object of the present invention to provide for decorative display devices that are portable and capable of being carried or moved about and operated without the need of an external power source, such as household power.

Moreover, it is an object of the present invention to provide decorative display devices having scenes that are revolved in apparent synchronization with a tune or melody that complements the aesthetic effect being depicted by the revolving scenes.

Further objects and features of the present invention will become evident hereinafter.

SUMMARY OF THE INVENTION

The present invention is directed to a decorative display device. The decorative display device comprises a first scene having a first base and at least one figurine contained within a transparent enclosure. The device further includes a second scene having a second base and at least one figurine. The second scene is preferably located below the first scene. The device includes a display base having an upper portion and a lower portion upon which the first and second scenes are positioned respectively at a predetermined vertical spacing. The device further includes drive means for producing rotational motion and coupling means for coupling at least one of the first base and the second base to the drive means. The drive means causes at least one of the first scene and the second scene to revolve around an axis. The transparent enclosure of the decorative display device is sealed and further contains a transparent liquid having particles immersed therein. The drive means of the decorative display device preferably includes music producing means for producing music simultaneously with producing the rotational motion.

The display base of the decorative display device includes an outer periphery. According to an embodiment of the present invention of the display device, the second scene is located below the first scene within the outer periphery of the display base. In this arrangement, the coupling means may cause the second scene to revolve around the axis. Alternatively, the coupling means may cause the first scene to revolve around the axis. Additionally, the coupling means may cause both the second scene and the first scene to revolve around the axis. The first scene may revolve around the axis in a first direction and the second scene may revolve around the axis in a second direction.

According to another embodiment of the present invention, the second scene may be located below the first scene, such that the second scene extends outside the outer periphery of the display base. In this arrangement, the coupling means may cause the second scene to revolve around the axis. Alternatively, the coupling means may cause the first scene to revolve around the axis. Additionally, the coupling means may cause both the second scene and the first scene to revolve around the axis. The first scene may revolve around the axis in a first direction and the second scene may revolve around the axis in a second direction.

The decorative display device has various embodiments that cause the scenes to revolve simultaneously, at different speeds (but in the same direction), in opposite directions, or in opposite directions at different speeds.

It is to be understood that both the foregoing general description and the following detailed description are exemplary and explanatory only. The description is not restrictive of the invention as claimed. The accompanying drawings, which are incorporated herein by reference and which constitute a part of the specification, illustrate certain embodiments of the invention and, together with the detailed description, serve to explain the principles of the present invention.

BRIEF DESCRIPTION OF THE DRAWINGS

The present invention will now be described in connection with the following figures in which like reference numerals refer to like elements and wherein.

DETAILED DESCRIPTION OF THE PREFERRED EMBODIMENTS

Figure 1:
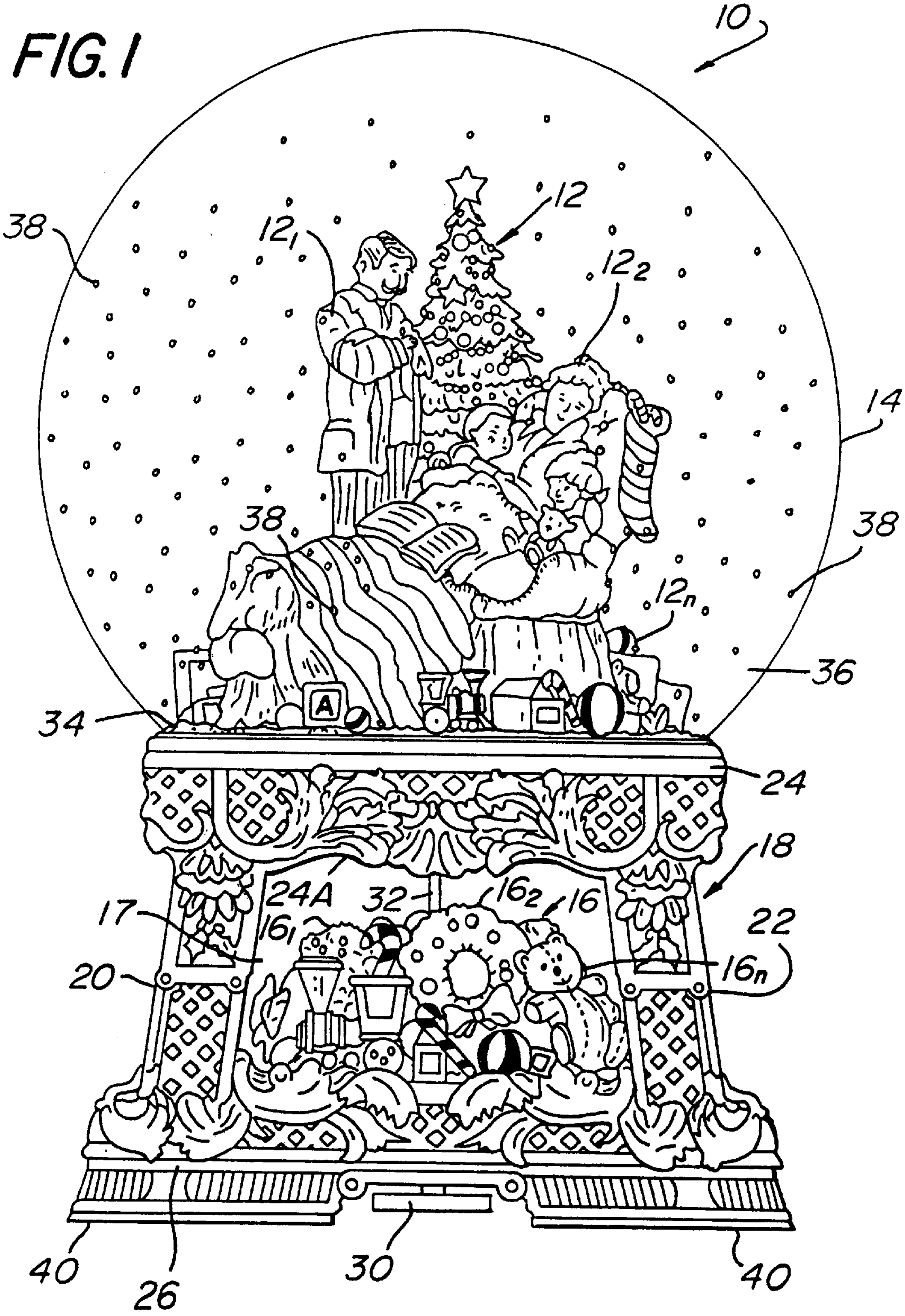
FIG. 1 is an elevational view of a selected side of the present invention.

FIG. 1 is an elevational view of a selected side of the decorative display device 10 of the present invention. The decorative display device 10 comprises a first scene 12 contained within a transparent enclosure 14, a second scene 16 exposed for direct viewing through a plurality of windows like window 17 in base 18. On either side of window 17 the base 18 comprises supports or columns 20, 22. An upper platform 24 and a lower platform 26 complete the base 18.

The decorative display device 10 further comprises a wind-up drive means 28 (see FIGS. 2 and 3) having a grippable knob 30 and a first output shaft 32 which may be interconnected to the scenes 12, 16 as will be described more completely hereinafter. Music is provided to the decorative display 10 by way of a music producing means such as a music box 48 which is combined with and forms part of the wind-up drive means 28 as will be explained below.

It will be apparent to those skilled in the art that various modifications and variations can be made in the construction and configuration of the present invention, without departing from the scope or spirit of the invention. For example, the drive means 28 may be a battery or electrically operated drive means. Thus, it is intended that the present invention cover the modifications and variations of the invention provided they come within the scope of the appended claims and their equivalents.

The decorative display device 10 is preferably arranged so that the first and second scenes 12, 16, respectively, are placed one above the other to form a tier, thereby placing both scenes in the same field-of-view of an individual. Each of the upper and lower scenes 12 and 16, respectively, may be drivenly connected to the drive means 28 which causes a rotation so that each scene appears to be in synchronization with the music or melody produced by the music box 48. Rotating, music-synchronized scenes are aesthetically pleasing, and thus, provide a more interesting display relative to known decorative display devices. The scenes 12, 16 may rotate simultaneously and synchronously (at the same speed in the same direction), or may rotate simultaneously and asynchronously (at different speeds in the same or opposite direction), or one scene may rotate (in either direction) while the other scene remains stationary, or both scenes may remain stationary.

The first scene 12, located on the upper tier of the decorative display device 10, comprises a plurality of figurines $\mathbf{12}_1$, $\mathbf{12}_2$ . . . $\mathbf{12}_\eta$, each of which are preferable formed of a well-known polymeric (or similar) materials and all of which are merged or blended into one integrated decorative scene, such as the family scene illustrated in FIG. 1 commonly associated with holidays such as Christmas.

The enclosure 14 may be formed of glass or other suitable transparent material, such as plastic. The transparent enclosure 14 may be of any desired shape but preferably has the shape of a globe with a flat bottom portion on which a base 34 of scene 12 of the integrated figurines $\mathbf{12}_1$, $\mathbf{12}_2$ . . . $\mathbf{12}_\eta$, is mounted. The transparent enclosure 14 is preferably sealed and is filled with an appropriate transparent liquid 36, such as water or an oil base liquid to achieve different aesthetic effects. The liquid 36 may have immersed therein small particles 38 of a selectable color, such as white, which simulates snow flowing or moving within the liquid, so that manual agitation of the decorative display device 10 causes a temporary suspension of the particles 38 in the liquid 36. When the decorative display device 10 is placed on a support surface, the particles 38 slowly settle onto the figurines $\mathbf{12}_1$, $\mathbf{12}_2$ . . . $\mathbf{12}_\eta$, thereby simulating falling snow.

The second scene 16, located on the lower tier of the decorative display device 10, comprises a plurality of figurines $\mathbf{16}_1$, $\mathbf{16}_2$ . . . $\mathbf{16}_\eta$, all preferably of a well-known polymeric (or similar) material and all merged into an integrated decorative scene, such as a pile of toys and holiday related items illustrated in FIG. 1 and commonly associated with a gift giving holiday such as Christmas. It is preferred that the designs of scenes 12, 16 be either complementary or contrasting relative to each other so as to enhance the noticeability and aesthetic effects imparted to a viewer thereof. Although scenes 12, 16 are both related to Christmas, it is to be recognized that other festive events may be depicted by the scenes 12, 16 in the practice of this invention.

The base 18 is preferably made of a metallic material and may have an ornamental design, as shown in FIG. 1, which provides for a blending aesthetic effect between the upper and lower scenes 12, 16 of the decorative display device 10. The base 18 has its lower platform 26 resting on legs 40 which serve a support function to provide support for the decorative display device 10. The lower platform 26 also serves a particular support function, which will be described with reference to FIG. 2.

Figure 5:
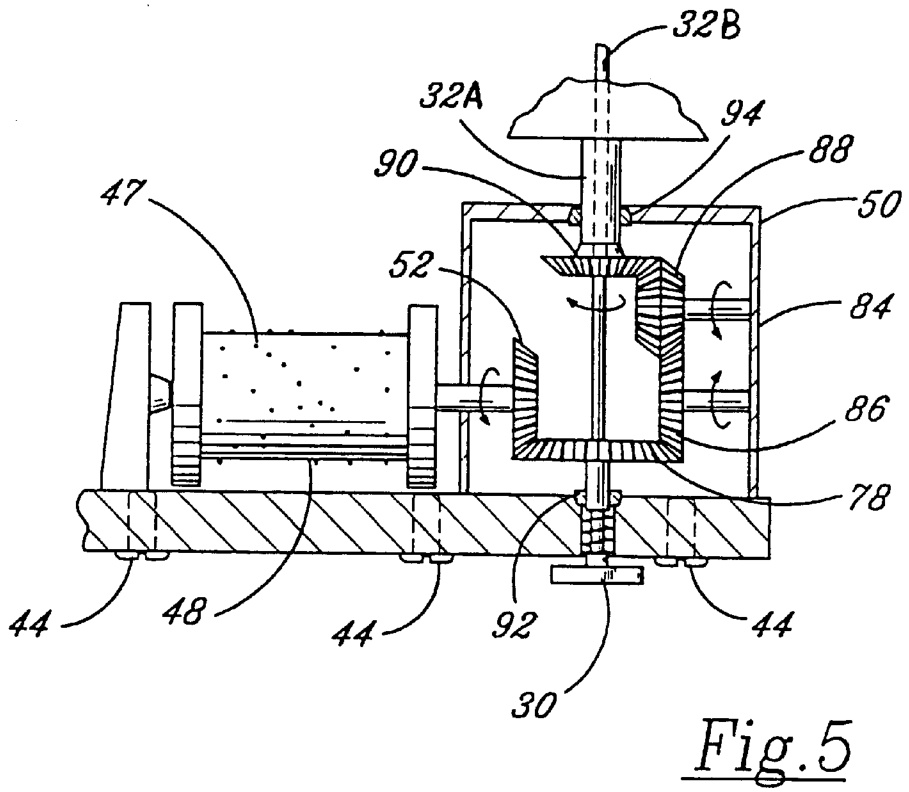
FIG. 5 is a sectional side view of another embodiment of the present invention showing one possible gear assembly allowing first and second scenes to rotate in the same direction, but a different speeds.
Figure 6:
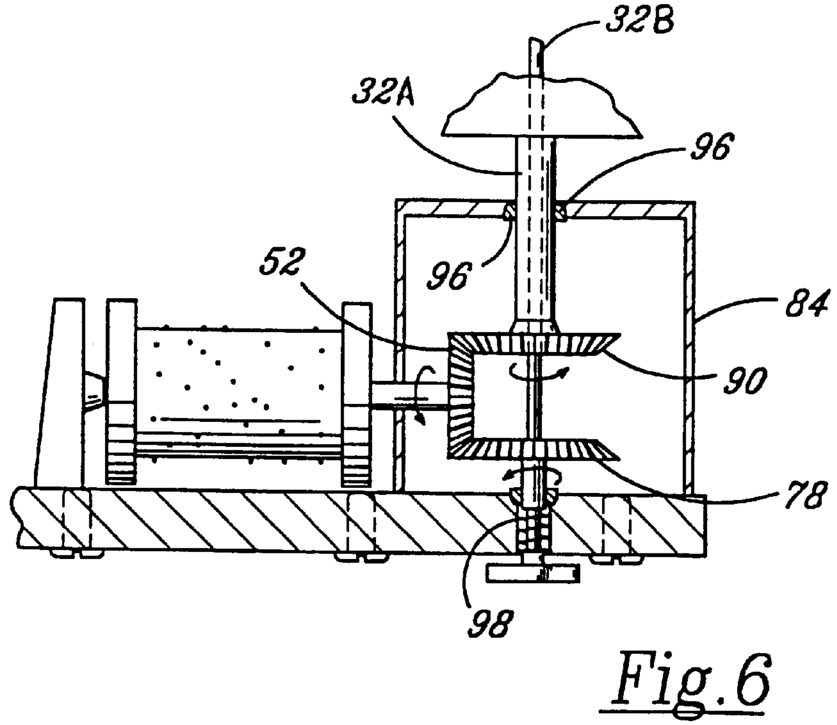
FIG. 6 is a sectional view of another embodiment of the present invention showing another possible gear assembly allowing first and second scenes to rotate in different directions.
Figure 7:
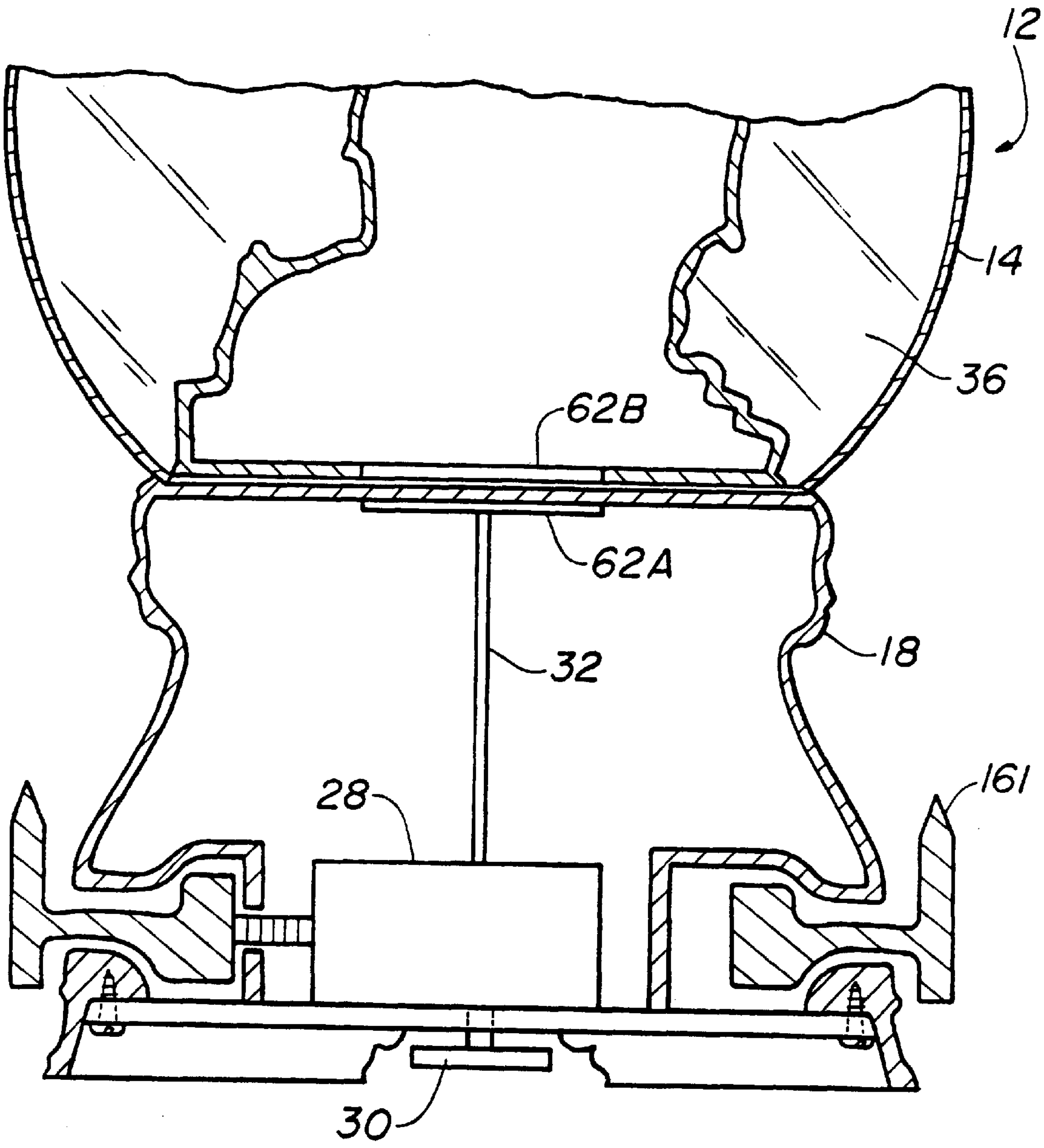
FIG. 7 is a sectional view of another embodiment of the present invention showing a second scene extending beyond the base of the display device.

The lower platform 26 has a circumferentially inwardly extending portion 26A to which the base 18 is attached by means of fastening means such as screws 42. The lower platform 26 supports the drive means 28 which is attached by fastening means such as screws 44 to the lower platform 26. The drive means 28 also comprises an upwardly extending member 46 which supports a drum 47 (with outwardly extending prongs arranged in a predetermined array) on a first end, which drum 47 forms part of the music box 48. The music box 48 is connected (at a second end) to a gear box mechanism 50 by means of a gear 52. The gear box mechanism 50 may comprise a coil spring 98, as shown in FIGS. 5 and 6, that is placed into tension by the rotation of the grippable know 30. When the grippable knob 30 is relaxed, the coil spring unwinds and imparts a corresponding rotation to the output shaft 32 having a lower portion 32A surrounding an upper portion 32B The present invention is not limited to a decorative display device having a second scene 16 positioned beneath the first scene 12; rather the second scene 16 may be vertically spaced from the first scene 12 and may extend beyond the base 18, as shown, for example in FIG. 7. In the embodiment disclosed in FIG. 7, the second scene 161 extends beyond the outer periphery of the base 18 such that the second scene 161 may resolve around the base 18. As shown in FIG. 7, the drive shaft drives into rotation a series of gears 162. The series of gears 162 meshes with second scene 161 such that the rotation of series of gears 161 drives second scene 161 into rotation.

Other arrangements are considered to be within the scope of the present invention including revolving scenes that are located outside the outer periphery of the base 18 in combination with revolving scenes located within the base 18.

In an embodiment of the present invention, the lower portion 32A of drive shaft 32 surrounds the upper portion 32B and is interconnected to a plate 54 which, in turn, is attached to the base of the second scene 16. This attachment may be effected in any known manner, such as by a thin layer of adhesive material 56. The second scene 16 also has a base 58 which is attached to the plate 54 and supports scene 16 in its predetermined position. The rotation of the plate 54 (through the connection of the plate 54 to the outer (lower) portion 32A of drive shaft 32) causes the rotation of the scene 16. The plate 54, in cooperation with the adhesive materials 56, serves as the means for mechanical coupling and for interconnecting the scene 16 to the output shaft 32 of the wind-up drive means 28. The upper portion 32B of the output shaft 32 passes through the scene 16, preferably in a non-interfering manner, and exits vertically from the scene 16 by way of aperture 60.

Figure 2:
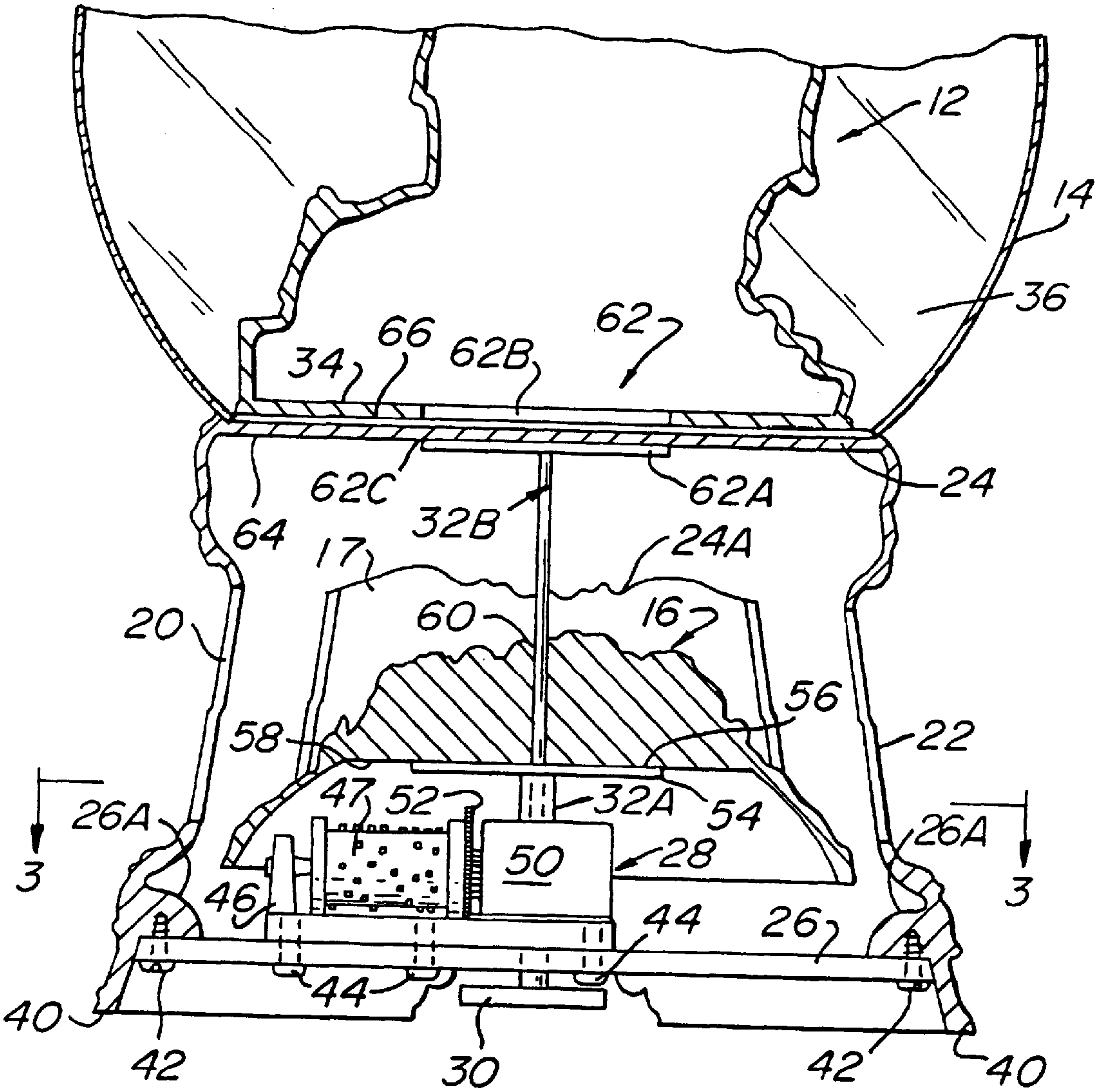
FIG. 2 is a partially broken-away view of the elevational view of FIG. 1 showing the positioning, arrangement, and interconnections of the first and second scenes and the drive means of the present invention.

The upper portion 32B of the output shaft 32 is connected to means 62 for magnetically coupling the base 34 of the scene 12 to the upper portion 32B of the output shaft 32, and to the drive means 28. The means 62 for magnetically coupling comprises a first plate 62A mechanically connected to the upward end of the upper portion 32B of the output shaft 32, a second plate 62B mechanically connected to the base 34 of the scene 12, and preferably seated within a downward facing recess in the base 34 as shown in FIG. 2. A mutual (magnetic) coupling path is created between the metallic (magnetized) plates 62A and 62B through the non-metallic platform 24 and a non-metallic base portion 64 of the transparent enclosure 14. The base portion 64 of the transparent enclosure 14 is physically separated from the base 34 of the scene 12 by a small gap 66 caused by the transparent liquid 36 to permit rotational movement of the scene 12 within the enclosure 14. Such movement is provided by the fluid 36 within the enclosure 14 which substantially eliminates the coefficient of friction between the base 34 of scene 12 and the base portion 64 of the enclosure 14.

The fluid 36 may be inserted into the enclosure 14 by way of an aperture (not shown) in the base portion 64 which is then sealed so that the fluid 36 remains within the sealed enclosure 14 without opportunity to evaporate or leak from the enclosure. The scene 12 within the sealed enclosure 14 is rotated because of the magnetic coupling means 62 although the base 34, of the scene 12 is not mechanically connected to the output shaft 32.

Figure 3:
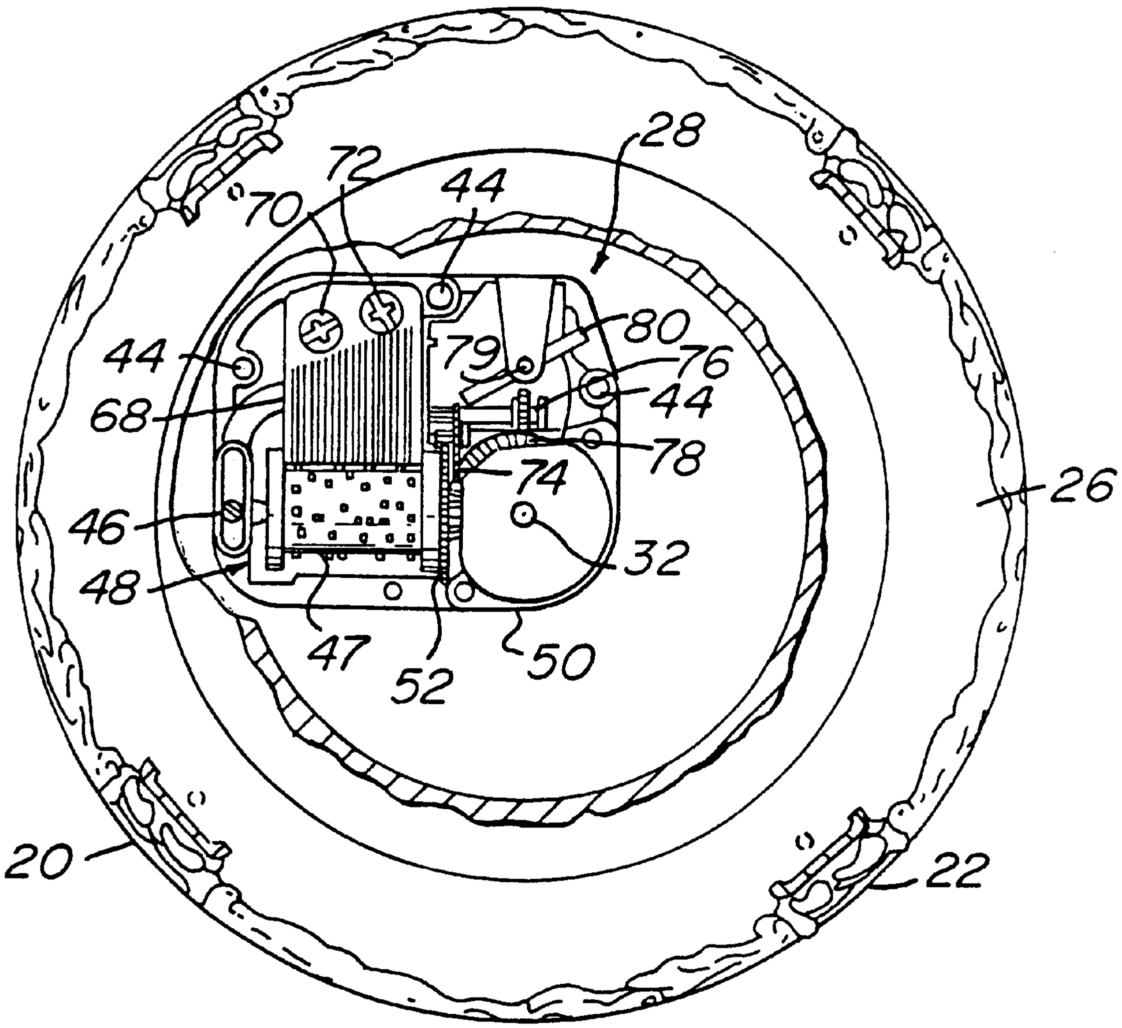
FIG. 3 is a sectional view of the invention, taken along line 3—3 of FIG. 2, illustrating further details of the combination drive means and music box of the present intention.

The drive means 28 provides the rotational rotational actuation of various components and will be described with particular reference to FIG. 3. FIG. 3 illustrates the drive means 28 as comprising a musical tine member 68 which contacts the pronged drum 47 and is preferably connected to the drive means 28 by way of screw members 70 and 72. The drive means 28 further comprises intermeshing gears 52, 74, 76, 78 all of which mesh so that the gear box mechanism 50 provides the impetus for moving the output shaft 32 of drive means 28. Intermeshing gears 52, 74, 76 and 78 are connected to the music box 48 and a dissipation assembly comprising a fly-wheel 80 and a standing helical gear 79 which serve to slow the rotation of the shaft 32. The output shaft 32 is positioned at the center of the decorative display device 10 so that the length of the shaft 32 extends along the vertical central axis of the display device 10.

The pronged drum 47, in cooperation with the tine element 68, provides a melody sounding device (music box 48) which allows for the drive means 28 to serve as a built-in source of music to accompany the revolving motion of scenes 12 and 16. The drum 47 and the tine element 68 may be appropriately selected so as to provide various melodies, for example, a Christmas melody, to enhance the aesthetic effects of the rotating scenes 12, 16. Moreover, since the drum 47 and the musical tine element 68 are interconnected and activated by the gear box mechanism 50, which can also activate the revolving motion of scenes 12, 16, the scenes 12 and 16 give the appearance to a viewer that the scenes 12, 16 are in synchronization with the melody being played by the combination of the drum 47 and the musical tine element 68.

The present invention is not limited to the above-described gear arrangement; rather the drive means 28 may be operatively connected to the scenes in such a manner so as to rotate either the first scene 12 or second scene 16 (for example, by a single gear). Additionally, the gear arrangement may be disposed around the central axis of the decorative display device.

Figure 4:
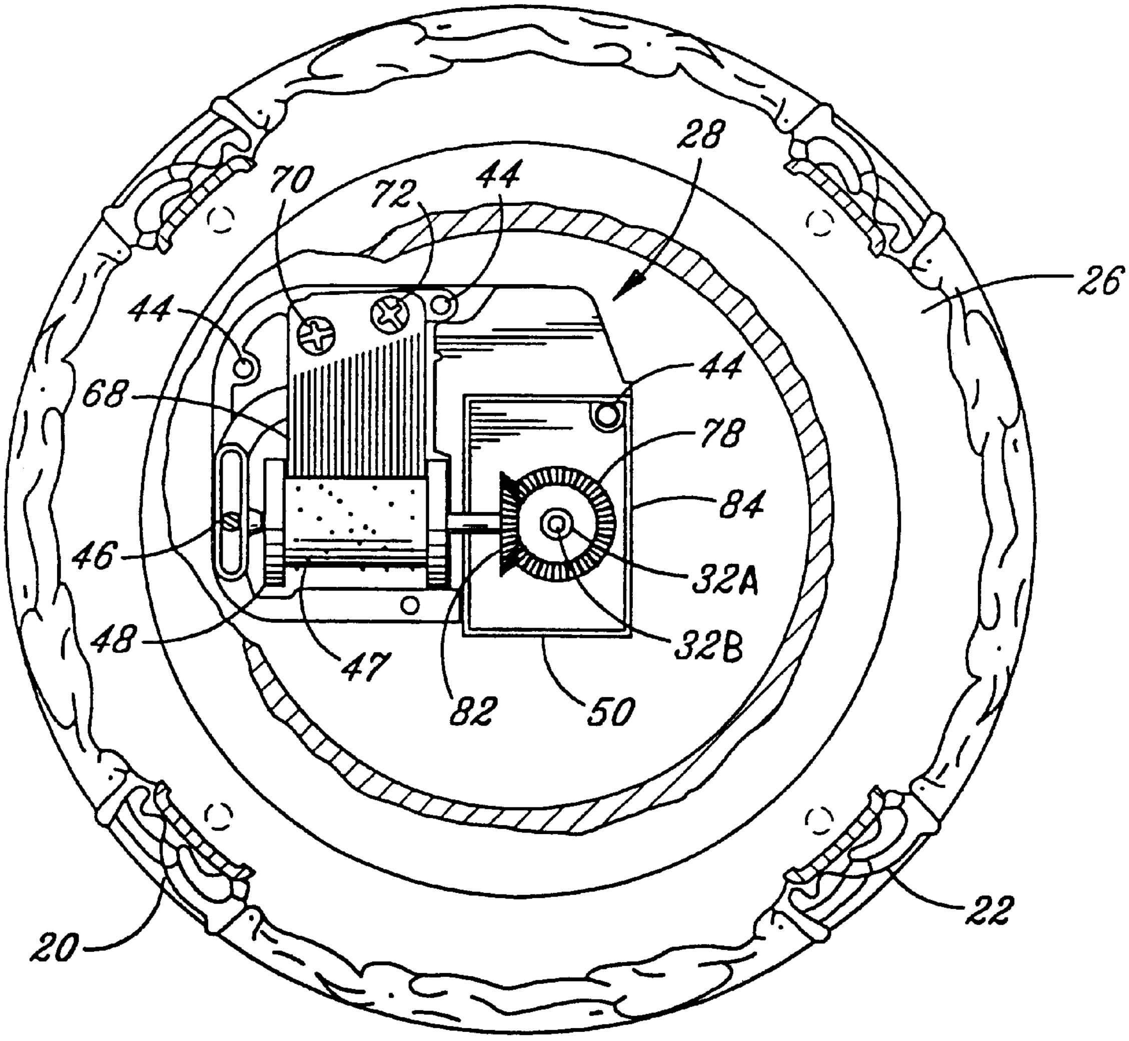
FIG. 4 is an elevational view of another embodiment of the present invention showing one possible gear assembly allowing first and second scenes to rotate in the same direction at the same speed.

As previously discussed, the scenes 12, 16 may revolve or remain stationary with respect to each other. In one embodiment of the present invention, the first scene 12 is not connected to the output shaft 32, but instead, is anchored firmly upon the upper platform 24 by means of an adhesive or other suitable mounting means. Similarly, in another embodiment of the present invention, the first scene is connected to the output shaft 32, but the second scene 16 is anchored firmly upon the lower platform 26 in a similar manner. In these embodiments of the decorative display device 10 of the present invention, rotational motion is imparted to only the lower tier, i.e., the second scene 16, while the upper tier, i.e., the first scene 12 remains stationary. Likewise, when the lower tier is fixed, the upper tier rotates. Such rotational motion may be in either direction, but only in one direction. In another embodiment of the present invention, as illustrated in FIG. 4, the scenes 12, 16 of the decorative display device 10 may be rotated in the same direction and at the same speed. This is afforded by a coupling of the shaft segment 32A and the shaft segment 32B in the gear box 50 so that both shaft segments 32A, 32B rotate in the same direction at the same speed. Since the shaft segments 32A, 32B are arranged concentrically one about the other such coupling is easily accomplished by connecting the shaft segments 32A, 32B to the same gear or drive member. An alternate embodiment as illustrated in FIG. 5 can impart different rotational speeds to each of the scenes 12, 16 by varying the diameter of the drive or gear to which the shaft segments 32A and 32B are connected within the gear box 50. The speeds will be proportional to the difference in the dimensional relationship of the respective gears or drive diameters.

FIG. 5 illustrates one option for gear box 50 which accomplishes the above-mentioned rotation. The gears within gear box 50 are configured to represent a speed altering means. The knob 30, when rotated, winds or tightens the coil spring 98. As the coil spring 98 unwinds it imparts rotational energy to bevel gear 78 which actuates the music box 48 and imparts rotational energy through bevel gear 86 and double bevel gear 88 which, in turn, imparts motion to bevel gear 90. Bevel gear 90 is smaller in diameter than gear 78 which creates a different rotational velocity. Bevel gears 78, 86, 88 and 90 are mounted to the gear box frame 84 as described more fully below. Mounted directly to gear 78 is the upper drive shaft 32B which runs through the center of bevel gear 90. Lower drive shaft 32A is attached directly to the upper surface of bevel gear 90 and is hollow to allow for upper shaft 32B to pass through along its central axis.

Bevel gear 90 is seated in gear box frame 84 at its upper end. The upper end of bevel gear 90 is bent in an arc-like fashion to form a rotatable connector 94. The rotatable connector 94 forms a cavity between the gear box frame 84 and the rotatable connector. Within this cavity is a lubricant 96 which will allow the upper end of bevel gear 90 to rotate upon the gear box frame 84. The lubricant 96 can be liquid or mechanical such as a micro-ball bearing system.

It will be apparent to those skilled in the art that various modifications and variations can be made in the construction and configuration of the drive means and gear arrangement of the present invention without departing from the spirit or scope of the invention. Thus, it is intended that the present invention cover the modification sand variations of the invention, provided they come within the scope of the appended claims and any other claim coverage afforded by applicable law.

Another embodiment of the decorative display device of the present invention imparts rotational motion that causes the scenes 12, 16 to be revolved in different directions and at the same or different speeds. Opposite direction rotational motion can be accomplished by connecting the shaft segments 32A and 32B to different gears or drives which rotate within the gear box 50 in different and opposing directions. The present invention also provides a gear box configuration which serves as a means for imparting motion in a first and second direction to the upper and lower scenes. FIG. 6 illustrates an example of this one gear box 50 option which will allow for rotation of the upper 12 and lower 16 scenes in the opposite direction at the same speed. In FIG. 6 coil spring 98 is again connected to the lower surface of bevel gear 78 which imparts rotational energy to bevel gear 52 which actuates music box 48. Bevel gear 52 also imparts rotational energy to bevel gear 90. The result of this gear configuration is that upper scene 12 will rotate at nearly the same speed, (exact matching speeds being difficult to achieve due to mechanical losses), but in the opposite direction. The upper surface of bevel gear 90 is connected to the gear box frame 84 by means of the rotatable connector 94 described above. If the gears or drives are sized identically, then the speed which is imparted to the respective shaft segments 32A, 32B is the same. The upper and lower scenes 12 and 16 can have opposite motion at different speeds. It is clear from the drawings that the addition of one more gear can be used to vary the speed of one of the scenes based on diameters and inevitable mechanical losses. If the gears or drives have dissimilar diameters, then the speed which will be imparted to the shaft segments 32A, 32B will be different and in proportion to the dimensional relationship of the respective gear or drive diameters.

Another embodiment, which has been partially described above and is illustrated in FIG. 5, imparts rotational motion to only the upper tier, i.e., the first scene 12, of the decorative display device 10 with the lower tier, i.e., the second scene 16, remaining stationary. In this embodiment the shaft segment 32B is connected to a drive or gear within gear box 50 and the shaft segment 32A is mounted to the case of the gear box 56 and remains static. In all of the recited embodiments where rotational motion is imparted to either or both scenes 12, 16, the motion is accompanied by the playing of the music box mechanism 48 so that the motion of the scenes 12, 16 is viewed while hearing the tones generated by the music box mechanism 48.

In operation, the revolving of the first scene 12 and second scene 16 is initiated by the rotational winding of the grippable knob 30 which, in turn, causes the coil spring (not shown) of the gear box mechanism 50 to be placed into tension. When the grippable know 30 is relaxed, the coil spring unwinds and imparts rotation to the output shaft 32 (either or both shaft segments 32A, 32B) which, in turn, imparts a corresponding rotational motion to either or both the plate 54 and the magnetic coupling means 62. For the embodiments of the decorative display device 10 of the present invention the rotation of scenes 12 and 16 provide for a noticeable and aesthetic effect to a viewer. Further, the upper tier scene 12 and the lower tier scene 16, positioned at different vertical levels, are both within the same field-of-view and, thus, further attract the attention of a viewer, so as to further enhance the aesthetic effect provided by the decorative display device 10 of FIGS. 1–3.

The present invention may be embodied in other specific forms without departing from the spirit or essential attributes thereof, and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

What is claimed is:

1. A decorative display device comprising:

a generally spherical transparent enclosure containing a first decorative scene;

a stationary base unit for supporting said transparent enclosure, said base unit having a side wall and a hollow interior, said side wall having generally circular cross section taken in a generally horizontal plane, said side wall having plurality of windows for visual access to the hollow interior;

a second decorative scene positioned within the interior hollow of said base unit and viewable through said windows, wherein said second decorative scene is rotatable relative to said base unit.

2. The decorative display device according to claim 1, wherein said side wall bears a decorative graphic.

3. The decorative display device according to claim 1, wherein the generally circular cross section of said base unit has a central axis, the central axis passing through substantially a center point of said transparent enclosure.

4. The decorative display device according to claim 1, further comprising a pronged drum and a tine member for producing music, said second decorative scene being operatively connected to said pronged drum such that said pronged drum rotates when said second decorative scene rotates.

5. The decorative display device according to claim 4, wherein said first decorative scene is rotatably supported by said base unit, said first and second decorative scenes being operatively connected to said pronged drum.

6. The decorative display device according to claim 1, further comprising a windup drive spring for driving a rotation of said second decorative scene.

7. A decorative display device comprising:

a generally spherical transparent enclosure;

a stationary base unit for supporting said transparent enclosure, said base unit having a side wall and a lower platform, said side wall and said lower platform defining an interior space within said base unit, said side wall having plurality of windows for visual access to the interior space;

a decorative scene positioned within the interior space of said base unit and viewable through said windows; and a music source affixed to said lower platform;

wherein said decorative scene is rotatable relative to said base unit.

* * * * *